(12) United States Patent
Schmid

(10) Patent No.: US 10,200,684 B2
(45) Date of Patent: Feb. 5, 2019

(54) DEVICE FOR MONITORING THE PROPER FUNCTIONING OF A TRANSMISSION PATH, PARTICULARLY OF A CAMERA

(71) Applicant: Mentor Graphics Corporation, Wilsonville, OR (US)

(72) Inventor: Carsten Schmid, Bad Duerrheim (DE)

(73) Assignee: Mentor Graphics Development (Deutschland) GmbH, Villingen-Schwenningen (DE)

( * ) Notice: Subject to any disclaimer, the term of this patent is extended or adjusted under 35 U.S.C. 154(b) by 418 days.

(21) Appl. No.: 14/911,237

(22) PCT Filed: Aug. 8, 2014

(86) PCT No.: PCT/EP2014/067129
§ 371 (c)(1),
(2) Date: Feb. 9, 2016

(87) PCT Pub. No.: WO2015/018942
PCT Pub. Date: Feb. 12, 2015

(65) Prior Publication Data
US 2016/0198151 A1    Jul. 7, 2016

(30) Foreign Application Priority Data

Aug. 9, 2013 (DE) .................. 10 2013 215 756

(51) Int. Cl.
*H04N 17/00* (2006.01)
*H04N 7/18* (2006.01)
*B60R 1/00* (2006.01)

(52) U.S. Cl.
CPC ............. *H04N 17/002* (2013.01); *B60R 1/00* (2013.01); *H04N 7/183* (2013.01); *B60R 2300/802* (2013.01)

(58) Field of Classification Search
CPC ......... H04N 17/002; H04N 7/183; B60R 1/00
(Continued)

(56) References Cited

U.S. PATENT DOCUMENTS

| 6,801,249 B1 | 10/2004 | Gobbo |
| 2002/0190972 A1 | 12/2002 | Ven de Van |
| 2013/0076899 A1 | 3/2013 | Eckelmann-Wendt et al. |

FOREIGN PATENT DOCUMENTS

| DE | 1020040352243 | 2/2006 |
| DE | 102008034160 A1 | 3/2010 |

OTHER PUBLICATIONS

International Search Report and Written Opinion of PCT/EP2014/067129, dated [PCT/ISA/210 and PCT/ISA/237].

*Primary Examiner* — Jeffrey A Williams
(74) *Attorney, Agent, or Firm* — Mentor Graphics Corporation

(57) ABSTRACT

The present invention relates to a device for monitoring the proper functioning of a transmission path, particularly of a camera (12), comprising a camera (12), particularly a digital camera, for capturing a detection area (14) and for generating corresponding first signals (S1), a display unit (26) for displaying the detection area (14) captured by the camera (12) using the first signals (S1), a light source array (18) arranged in the detection area (14) of the camera (12), a detection unit (30) with an optical measuring sensor array (32) for detecting the display output of the display unit (26) and for generating corresponding second signals (S2), a monitoring unit (36) that actuates the light source array (18) using a pre-definable pattern (M) and checks whether the second signals (S2) detected by the detection unit (30) contain the pattern (M), during evaluation of the display output of the display unit (26), and a communication unit (24) for transmitting the first and second signals (S1, S2) and (Continued)

the pre-definable pattern (M). The invention further relates to a corresponding method and a corresponding computer program.

16 Claims, 1 Drawing Sheet

(58) Field of Classification Search
USPC .......................................................... 348/148
See application file for complete search history.

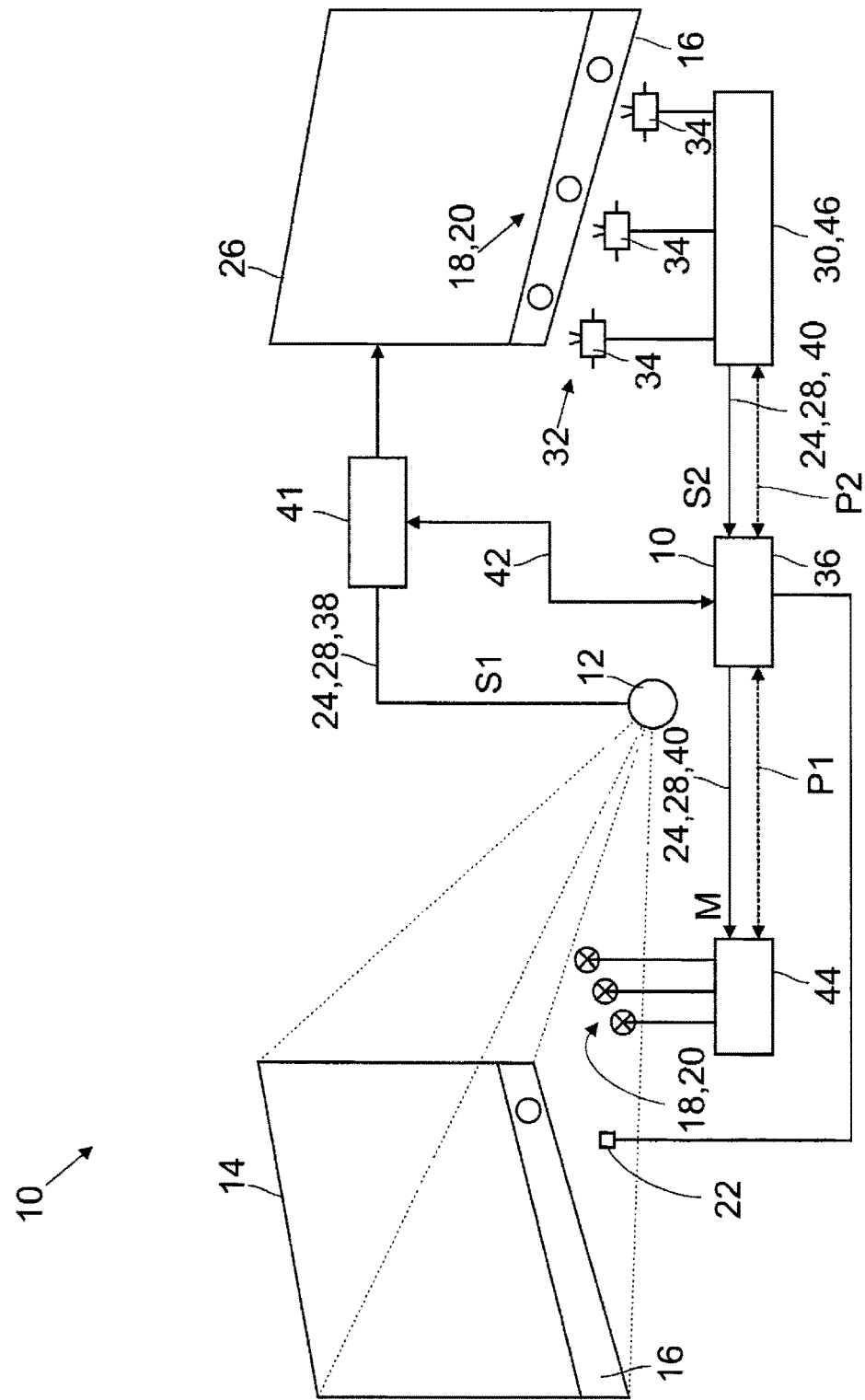

DEVICE FOR MONITORING THE PROPER FUNCTIONING OF A TRANSMISSION PATH, PARTICULARLY OF A CAMERA

RELATED APPLICATIONS

This application is a National Stage of International Application No. PCT/EP2014/067129, filed Aug. 8, 2014, claiming priority based on a German Patent Application No. 102013215756.8, filed Aug. 9, 2013, the contents of all of which are incorporated herein by reference in their entirety.

TECHNICAL FIELD

The present invention relates to a device for monitoring the proper functioning of a transmission path, particularly of a camera and especially a digital camera. The invention further relates to a corresponding method and a computer program. Cameras, and particularly digital cameras, are being used in more and more areas of technology in today's world and in recent times have been used increasingly in the automotive sector.

Known examples of application areas are rear view cameras in private or commercial vehicles. One application area that will be of greater importance in the future is digital playback systems, which will provide assistance to the driver in addition to or as a replacement for the visual rear-view mirror and thus contribute to driving safety in the manner described, for example, in DE 10 2007 044 536. The digital playback systems known up to this point have been equipped with a digital camera, a corresponding processing unit, and a display unit. When digital playback systems are used in private or commercial vehicles, international standards, such as SIL (Safety Integrity Level) or ASIL (Automotive Safety Integrity Level), which are specified in ISO 26262, require that the data transmitted by the digital camera be verified with respect to integrity, latency period and validity, to ensure satisfactory operation. With the known digital playback systems, a certain data pattern is introduced between the camera and the processing unit, which must be extracted and evaluated at the processing unit in order to determine whether the data will be forwarded. The known digital playback systems, however, do not enable the optical sensor of the digital camera, particularly a CCD or CMOS sensor, to be included in the verification, which means that end-to-end verification cannot be carried out. Thus, it is impossible to determine whether the digital camera is even providing current data or a frozen still image, which means that the driver of the vehicle cannot tell whether or not there is something moving behind the stationary vehicle. The software for the known digital playback systems also cannot differentiate between the two possibilities. DE 295 20 980 describes a device for testing a CCD or CMOS sensor of a digital camera in which a pattern is optically projected into the detection area. The pattern is compared to a pattern stored in the processing unit. In this case, the digital camera is mainly used to secure an area around an object, for example around a machine tool. No display unit is provided; furthermore, a purely digital internal comparison of the detected pattern with the projected pattern is carried out.

Therefore, the problem of the present invention is to further develop a device of the above-mentioned type so as to enable highly reliable monitoring of the proper functioning of an entire transmission path, particularly a camera as used particularly in automotive applications, such as in rear view cameras or digital playback systems, and a display unit, in order to thus contribute to driving safety. In particular, the device should make it possible to monitor the entire transmission path and determine a latency period of the transmitted signals. A further problem of the present invention is to propose a corresponding method and a corresponding computer program.

SUMMARY

The problem is solved by a device comprising a camera for capturing a detection area and for generating corresponding first signals, a display unit for displaying the detection area captured by the camera using the first signals, a light source array arranged in the detection area of the camera, a detection unit with an optical measuring sensor array for detecting the display output of the display unit and for generating corresponding second signals, and a monitoring unit that actuates the light source array using a pre-definable pattern and checks, while evaluating the display output of the display unit, whether the second signals detected by the detection unit contain the pre-definable pattern, and a communication unit for transmitting the first and second signals and the pre-definable pattern.

The device functions as follows: The camera comprises an optical sensor, for example a CCD or CMOS sensor, and captures a certain detection area, for example an area behind a private or commercial vehicle, and generates corresponding first signals. The detection area contains the light source array that can be actuated with a pre-definable pattern which is predetermined by the monitoring unit. For example, the light source array may consist of a number of LEDs or mini-TFTs which light up or are switched off in a certain sequence, and is predetermined by the pre-definable pattern. The camera records the LEDs lighting up and going out, which means that the pre-definable pattern is incorporated in the first signals. The communication unit, which in the simplest case is an electric lead, transmits the first signals to the display unit, which displays the detection area and therefore also shows the LEDs lighting up and going out. The detection unit detects the display output of the display unit by means of the optical measuring sensor array and thus also detects the LEDs lighting up and going out. The second signals generated by the detection unit thus contain the pre-definable pattern as well. The monitoring unit checks the second signals particularly to determine whether the pre-definable pattern is present. If it is, the proper functioning of the device and particularly of the camera and display unit is verified. In the event that the monitoring unit cannot detect the pre-definable pattern in the second signals, it emits a warning signal indicating that at least one component of the device is not functioning properly. Failure probabilities of the components can be stored in the monitoring unit, which means that the camera, for example, has a certain probability of being affected by a particular fault, thus making it easier to locate the error and replace the affected component.

As already mentioned at the beginning, pre-definable patterns are currently used in comparable known devices in order to determine whether the pattern that is introduced into the device at a first location is reaching a second location. In known devices, however, the pre-definable pattern is introduced downstream of the camera and sampled upstream of the display unit, viewed in the direction of transmission of the first signal. Therefore, the signal does not travel through the camera and the display unit. This therefore cannot check the proper functioning of the camera and the display unit, but only that of components downstream of the camera and upstream of the display unit. According to the invention, however, the pre-definable pattern has to travel right through the camera and the display unit. If the camera has an operational fault, the result is that the first signals generated by the camera do not contain the pre-definable pattern or do not contain it completely, which means that the operation of the camera has been included in the test. Thus, in contrast to the known devices, the proper functioning of the entire transmission path, including the camera and the display unit, can be determined or checked.

A particular advantage of the device according to the invention is that the basic setup between the camera and the display unit, as used in existing devices, for example digital playback systems, does not have to be changed. The light source array can be moved into the detection area of the camera using a bracket. A similar procedure may be carried out with the detection unit. In addition, the monitoring device must have the appropriate software.

In a preferred embodiment, the communication unit comprises a first channel with which the first signals can be transmitted between the camera and the display unit, and a second channel with which the second signals can be transmitted between the detection unit and the monitoring unit. It is possible, for example, to use only one channel within the device via a bus system, this channel being used alternately to transmit the first or second signals. If, however, two separate channels are used, then the monitoring unit is completely independent of the communication unit. Any errors occurring in the first channel, for example the deleting of a contact, are not then transmitted to the second channel, which means that the monitoring of the device will be less susceptible to faults as a whole. The provision of two channels does not exclude the use of a bus system. For example, a serializer-deserializer method may also be used. Different transmission times may be obtained depending on the transmission method used, and this has to be taken into consideration when calculating the latency time.

Preferably, a transmitter unit is arranged in the first channel for transmitting the first signals from the camera to the display unit. The transmitter unit may, for example, convert the first signals generated by the camera into another format which the display unit can read, or read more easily. Furthermore, the transmitter unit may also have a wireless path for transmitting some of the first signals wirelessly. The monitoring unit may be configured in just the same way in order to transmit the second signals and the pre-definable pattern accordingly. The wireless signal transmission is suitable, for example, with rear view cameras for trailers so that there is no need to attach or remove an additional cable when hitching up or disconnecting the trailer.

Furthermore, the transmitter unit and the monitoring unit have communication means for communicating with each other. The communication with each other makes it possible for the transmitter unit and the monitoring unit to perform mutual functional checks. To this end, a very simple enquiry can be sent from the transmitter unit to the monitoring unit, to which the transmitter unit must respond within a certain time period. The monitoring unit does the same in reverse with the transmitter unit. If there is no response, the particular unit that sent the enquiry generates a corresponding warning signal. This increases the reliability and the operational safety of the device.

Preferably, the device has first checking means by which the monitoring unit can check the proper functioning of the light source array. This may be done, for example, by means of a self-test or by measuring internal resistance (resistance measurement). The information as to whether the light source array is functioning or not helps in identifying the component that is actually faulty. If the light source array is functioning properly but the monitoring unit cannot find the pre-definable pattern in the second signals, either the camera, the transmitter unit or the detection unit is not functioning properly. If the light source is not functioning properly and the monitoring unit either cannot identify the pre-definable pattern at all or can only identify it partially in the second signals, there is no need to emit a warning signal to indicate that the camera is defective. If the second signal confirms the results of the functionality test on the light source array, for example in the event that the light source array has only partially failed, this information is confirmation of the proper functioning of the remaining components of the device. A warning signal can still be generated to indicate the faulty operation of the light source array so that it can be repaired quickly.

In a preferred embodiment, the device has second checking means with which the monitoring unit can check the proper functioning of the detection unit. Again, this may be done using a self-test or a resistance measurement. In this manner, errors in the pre-definable pattern that is present in the second signals can be excluded as the reason why the detection unit is not functioning properly. Particularly in conjunction with the first checking means, it is possible to narrow down the faulty component still further and particularly to prevent a warning signal from being generated that would indicate a supposed malfunction of the camera even though it is other components of the device that are not functioning properly. This increases the reliability of the device. In particular, a corresponding warning can also be generated to the effect that the detection unit is no longer operational and therefore needs to be replaced.

In addition, an electronic check may also be carried out on the first signal upstream of the display unit. If the pre-definable pattern is detected in the first signal but not in the second signal, the error can be narrowed down to the area of the display and detection unit.

It has been found to be advantageous if the light source array is located in an edge region of the detection area of the camera. The light source array conceals objects that are located behind the light source array, when viewed from the camera. The light source array is less intrusive in the edge region of the detection area and is hardly noticed by the user of the device. Furthermore, it is usually the case that objects located in the edge region are less relevant to safety than objects in the centre of the detection area.

Preferably, the device also has a brightness sensor that can detect the light conditions in the detection area. If it is particularly bright in the detection area, the pre-definable pattern can be modified accordingly so that it can still be satisfactorily captured by the camera. Depending on the type of light sources used, it is possible to vary the brightness and/or colour of the light they produce.

A further aspect of the invention relates to a method for monitoring the proper functioning of the camera, comprising the following steps:
  recording a detection area and generating first signals by means of a camera;
  displaying the detection area captured by the camera using the first signals by means of a display unit;
  positioning a light source array in the detection area of the camera;
  detecting the display output of the display unit and generating corresponding second signals by means of a detection unit having an optical measuring sensor array;
  actuating the light source array using a monitoring unit, which actuates the light source array with a pre-definable pattern and checks whether the second signals detected by the detection unit contain the pattern while evaluating the display output of the display unit;

transmitting the first and second signals and the pre-definable pattern with a communication unit; and generating a warning signal in the event that the second signals detected by the detection unit do not contain the pattern or do not contain it completely or contain it in modified form.

The advantages that can be achieved with the method according to the invention correspond to those that have been described for the device according to the invention. In particular, the proper functioning of the device, including the camera and the display unit, can be checked; this has not been possible with systems available up until now. In the process, algorithms can be stored in the monitoring unit which are able to provide a more precise analysis of cases where the second pattern is not fully contained in the second signals. As mentioned at the beginning, the devices according to the invention and the method according to the invention relate particularly to the monitoring of digital cameras which operate on a pixel basis, as is well known. In the event that a black dot appears in the area in which the display unit is imaging one or more of the LEDs arranged in the detection area and thus a number of pixels are not generating the expected value, this may indicate dirt on the camera lens. It is also possible to check the brightness of the pre-definable pattern.

A further advantage results from the fact that, with a suitable choice of dimensions for the light source array and particularly the size of the LEDs, image compression algorithms may be used without leading to misinterpretations. The patterns introduced digitally in the prior art may be corrupted by the image compression algorithm used.

The method according to the invention is further characterised by the following steps:

actuating the light source array with the pre-definable pattern at a first time with the monitoring unit;

checking the second signals to determine whether they contain the pre-definable pattern and determining a second time at which the monitoring unit detects the pre-definable pattern in the second signals; and the monitoring unit generating a warning signal when the difference between the first time and the second time exceeds a pre-definable threshold value.

In this embodiment, the so-called latency period can be determined. The latency period in this case is the time that a signal takes to go from the camera to the display unit or to the monitoring unit. Both in rear view cameras and in optical playback systems, it is extremely important that the images provided not only have the correct content but are also up-to-date. If the latency period or the difference between the first time and the second time exceeds a pre-definable threshold value, then the latency period is too long, which means that the images displayed by the display unit will no longer be current enough to assist the driver. In this case, too, the monitoring unit can generate a warning signal that indicates an excessive latency period. Depending on which transmission method has been selected, for example whether the communication unit has a first and a second channel or only one channel or whether a serializer-deserializer method is being used, there will be different transmission times which have to be taken into consideration when specifying the threshold value.

Furthermore, the light source array is preferably actuated with a pre-definable pattern that can be changed over time. This creates a dynamic system such that the monitoring unit can also clearly map any pre-definable pattern that it used to actuate the light source array to the pre-definable pattern that it receives back from the second signals. If the same pre-definable pattern is used every time, there is the risk that the unique mapping will be lost and the monitoring unit may arrive at some misinterpretations.

Preferably, the method further comprises the following steps:

checking the proper functioning of the light source array by means of the monitoring unit using first checking means; and adjusting the pre-definable pattern while taking account of the results of the checking during evaluation of the second signals by the monitoring unit.

If the light source array is no longer fully functional, as is the case for example if some of the LEDs have failed, then this does not necessarily mean that the camera is no longer working. However, the pre-definable pattern transmitted by the second signals would be incomplete, which the monitoring unit could interpret as a fault or as dirt on the camera. In this embodiment of the method, it is still possible for the proper functioning of the camera to be reliably checked even when the light source array is no longer operating fully. The number and position of the LEDs is recorded and the pre-definable pattern contained in the second signals is adjusted accordingly. In this regard, the monitoring unit will not generate any warning signal or indicate a fault with or dirt on the camera if it knows that the pre-definable pattern transmitted by the second signals has been modified accordingly.

Preferably, the method further comprises the following steps:

checking the proper functioning of the detection unit by means of the monitoring unit using second checking means; and adjusting the pre-definable pattern while taking account of the results of the check during evaluation of the second signals by the monitoring unit.

Similar remarks to those made previously concerning the first checking means apply here. If one of the sensors of the optical measuring sensor array is no longer functioning, the pre-definable pattern transmitted by the second signals is no longer the one that was used by the monitoring unit to actuate the light source array. In this case, the monitoring unit would report camera malfunction or dirt on the camera, but this does not correspond to reality. Thus, if it is known which of the sensors of the optical measuring sensor array is not working, the monitoring unit knows that the change in the pre-definable pattern being transmitted by the second signals was caused by the failure of the sensor. In this case, the monitoring unit will not generate a warning signal indicating a defective or dirty camera but will rather use the warning signal to indicate a defective sensor, as is the case.

It is preferable if the method further comprises the following steps:

providing a transmitter unit for transmitting the first signals from the camera to the display unit;

the transmitter unit and the monitoring unit checking each other for proper functioning using communication means to communicate with one another; and a warning signal being generated by the unit that detects a loss of function in the other unit.

The transmitter unit may be used to convert the signals generated by the camera into another format which the display unit can read, or read more easily. Furthermore, the transmitter unit may also have a wireless path for transmitting some of the first signals wirelessly. The monitoring unit may be designed in precisely the same manner in order to transmit the second signals and the pre-definable pattern correspondingly. The communication with each other makes it possible for the transmitter unit and the monitoring unit to carry out functional checks on each other. To this end, a very simple enquiry may be sent from the transmitter unit to the monitoring unit, to which the transmitter unit must respond within a certain time. The monitoring unit does the same in reverse with the transmitter unit. If there is no response, the particular unit that sent the enquiry generates a corresponding warning signal. This increases the reliability and the operational safety of the device.

Preferably, the method according to the invention comprises the following steps:
  checking, by means of the transmitter unit, whether the first signals contain the pre-definable pattern; and
  taking the results of the check into account in the evaluation of the second signals by the monitoring unit.

As previously described, the transmitter unit is located between the camera and the display unit. Once the monitoring unit notifies the transmitter unit that the light source array has been actuated with the pre-definable pattern, the transmitter unit must also find the pre-definable pattern in the first signals, if the light source array and the camera are functioning properly. If it is the case that the detection unit is functioning properly but the pattern is not contained in the second signals, this means the display unit is not functioning properly. Consequently, the changes in the pre-definable pattern in the second signals cannot be put down to a loss of function in the camera, but rather to the display unit. In the event that the light source array is functioning properly but the transmitter unit cannot detect the pre-definable pattern in the first signals, this indicates that the camera is no longer working. If the monitoring unit receives notification from the transmitter unit and from the second signals that the pre-definable pattern is no longer there or has been modified, this indicates that the detection unit and the display unit are functioning correctly. This therefore makes it possible to precisely identify the faulty component, on the one hand, and to confirm the proper functioning of the other components, on the other hand.

Preferably, the method according to the invention comprises the following steps:
  determining the light conditions in the detection area by means of a brightness sensor; and
  taking account of the light conditions during the actuation of the light source array by the monitoring unit.

The light conditions in the detection area may be so unfavourable that the pre-definable pattern emitted by the light source array cannot be sufficiently captured by the camera because the contrast is too weak. The monitoring unit can actuate the light source array such that the pre-definable patterns are readily discernible despite the unfavourable light conditions, for example by increasing the brightness of the light sources used or by changing the colour of the light generated by the light source. The frequency with which the light sources light up and go out can also be increased. This then prevents the pre-definable pattern from being lost due to the light conditions in the detection area, thereby resulting in misinterpretations. The information regarding the light conditions can also be used to determine whether the pre-definable pattern is also being captured by the camera at the luminous intensity specified by the light source array. If the luminous intensity captured is significantly less than the luminous intensity specified by the light source array, this may be an indication that a large area of the camera lens is covered with a film of dirt.

A further aspect of the present invention relates to a computer program for operating a monitoring unit in a device for monitoring the proper functioning of a camera, the device comprising:
  a camera for capturing a detection area and for generating corresponding first signals;
  a display unit for displaying the detection area captured by the camera using the first signals;
  a light source array located in the detection area of the camera;
  a detection unit with an optical measuring sensor array for detecting the display output of the display unit and for generating corresponding second signals; and
  a communication unit for transmitting the first and second signals and the pre-definable pattern,
the computer program comprising programming means for causing a computer to execute the following steps when the computer program is run on the computer:
  actuating the light source array with the monitoring unit that actuates the light source array with a pre-definable pattern; and
  checking with the monitoring unit whether the second signals detected by the detection unit contain the pattern during evaluation of the display output of the display unit.

The advantages and technical effects that are achieved by the computer program according to the invention correspond to those that have been described for the method according to the invention and the device according to the invention.

DESCRIPTION OF THE DRAWING

The invention is hereinafter explained in greater detail by means of an exemplary embodiment with reference to the appended drawings, wherein:
FIG. 1 shows an exemplary embodiment of a device according to the invention by means of a schematic diagram.

DETAILED DESCRIPTION

FIG. 1 shows an exemplary embodiment of a device 10 according to the invention for monitoring the proper functioning of a transmission path, particularly of a camera 12. The camera 12 to be monitored is capable of capturing a detection area 14, in the edge region 16 of which is disposed a light source array 18 with three light sources 20, for example LEDs. In the example shown, a horizontal array of three light sources 20 has been selected, although a vertical or diagonal or other arrangement is also possible. The number of light sources 20 is also by no means limited to three. The edge region 16 cannot be completely monitored by the camera 12, which means that it should be kept as small as possible. The circles in the edge region 16 indicate the ghost image of the light sources 20. Consequently, the LEDs should be designed as small as possible so that they encroach as little as possible on the detection area 14 of the camera 12. However, the light sources 20 should be dimensioned such that, if compression algorithms are used, they are larger than the macro blocks of the compression algorithm. This prevents the possibility of some of the light sources 20 not being taken into consideration, resulting in misinterpretations by the monitoring unit 36. In the practical embodiment, the light source array 18 may be positioned in front of the camera lens using a bracket (not shown). Existing cameras can easily be retrofitted.

Furthermore, the device 10 comprises a brightness sensor 22 that can be used to ascertain the light conditions in the detection area 14.

The camera 12 generates first signals S1 relating to the detection area 14 which are transmitted by a communication unit 24 to a display unit 26 which displays the detection area 14 and particularly the image of the edge region 16 and the light source array 18. In the simplest case, the communication unit 24 comprises electric leads 28.

The device 10 further comprises a detection unit 30 having an optical measuring sensor array 32, which is used to detect the display output of the display unit 26 and convert it into corresponding second signals S2. In the embodiment shown, the optical measuring sensor array 32 has three measuring sensors 34.

The detection unit 30 is in turn connected to a monitoring unit 36 via the communication unit 24, the monitoring unit 34 also being connected to the light source array 18 and to the brightness sensor 22. In the embodiment shown, the communication unit 24 has a first channel 38 and a second channel 40. The first channel 38 extends between the camera 12 and the display unit 26, while the second channel 40 extends between the detection unit 30, the monitoring unit 36 and the light source array 18. Consequently, the first signals S1 can be transmitted between the camera 12 and the display unit 26 using the first channel 38, and the second signals S2 can be transmitted between the detection unit 30 and the monitoring unit 36 with the second channel 40, and the pre-definable pattern M can be transmitted from the monitoring unit 36 to the light source array 18.

A transmitter unit 41 having communication means 42 by which it can communicate with the monitoring unit 36 is located in the first channel 38. Furthermore, the device 10 comprises first checking means 44, which can be used to verify the proper functioning of the light source array 18, and second checking means 46 with which the monitoring unit 36 can check the proper functioning of the detection unit 30. The corresponding communication is represented by arrows P1 and P2.

The device 10 is operated as follows: The monitoring unit 36 actuates the light source array 18 through the second channel 40 with a pre-definable pattern M, such that the LEDs light up and go out in a certain sequence. The pre-definable pattern M may be, for example, a light-dark pattern, but any other pattern may also be chosen. Because the light source array 18 is arranged in the detection area 14 of the camera 12, the camera 12 captures the pre-definable pattern M such that the first signals S1 generated by the camera 12 also contain the pre-definable pattern M. The first signals S1 are transmitted to the display unit 26 through the first channel 38 of the communication unit 24, and also pass through the transmitter unit 41. The transmitter unit 41 checks whether the pre-definable pattern M is contained in the first signals S1 and informs the monitoring unit 36 accordingly, using the communication means 42. The light source array 18, the light sources 20, and the lighting up and going out of the pre-definable pattern M are displayed by the display unit 26, such that the detection unit 30 detects the pre-definable pattern M, with the result that it is contained in the second signals S2 generated by the detection unit 30 which reach the monitoring unit 36 through the second channel 38 of the communication unit 24.

When all of the components of the device 10 are functioning properly, the monitoring unit 36 receives the pre-definable pattern M back from both the transmitter unit 41 and the detection unit 30. In addition, the monitoring unit 36 can also determine the latency period, i.e. the time difference from the actuation of the light source array 18 until receipt of the pre-definable pattern M present in the second signals S2 provided by the detection unit 30. The monitoring unit 36 checks whether or not the latency period has exceeded a certain threshold value. In the event that this threshold value is exceeded, the monitoring unit 36 generates a corresponding warning signal.

If the second signals S2 do not contain the pre-definable pattern M, one of the components in the device 10 is no longer functioning properly. The monitoring unit 36 can determine, with the assistance of the first checking means 44, whether the light source array 18 is functioning properly. If it is not, then the cause of the fault has already been determined. However, if the light source array 18 is functioning properly, the transmitter unit 41 checks whether the first signals S1 generated by the camera 12 contain the pre-definable pattern M. If this is not the case, the camera 12 is defective. Because it is mainly digital cameras that are meant, the assumption is that the CCD sensor is no longer functioning.

If the pre-definable pattern M is contained in the first signals S1, the monitoring unit 36 will determine, using the second checking means 46, whether the detection unit 30 and particularly the optical measuring sensor array 32 are functioning properly. If this is not the case, the error is within the detection unit 30. If it is functioning properly, however, then the display unit 26 is defective.

In addition, the monitoring unit 36 and the transmitter unit 41 check each other for proper functioning by sending each other enquiries and responses using the communication means 42.

It is a different matter if the second signals S2 contain the pre-definable pattern M only partially or in modified form. If one or more of the LEDs in the light source array 18 or one or more of the measuring sensors 34 of the optical measuring sensor array 32 of the detection unit 30 are no longer functioning, some of the pre-definable pattern M is missing. Through the checking of the proper functioning of the light source array 18 and the detection unit 30, the monitoring unit 36 is informed as to which part of the pre-definable pattern M is missing. If the pre-definable pattern M received actually no longer has the part, but is otherwise unchanged, then all the components of the device 10 are working, with the exception of the light source array 18 or the detection unit 30.

If, in spite of the light source array 18 and detection unit 30 working properly, part of the pre-definable pattern M is missing, this may be caused by dirt on the camera lens.

The brightness sensor 22 quantifies the light conditions in the detection area 14. The first signals S1 may also contain additional information as to the light intensity at which the camera 12 captured the pre-definable pattern M. If there is a deviation between the luminous intensity expected and the luminous intensity measured, this may indicate that the camera lens is covered with a film of dirt. If the light conditions in the detection area 14 are very unfavourable, the monitoring unit 36 can actuate the light source array 18 such that the pre-definable pattern M can still be detected easily by the camera 12.

In any case in which there is a deviation from the ideal, the monitoring unit 36 can generate a corresponding warning signal.

LIST OF REFERENCE NUMERALS

10 Device
12 Camera

14 Detection area
16 Edge region
18 Light source array
20 Light source
22 Brightness sensor
24 Communication unit
26 Display unit
28 Electric lead
30 Detection unit
32 Optical measuring sensor array
34 Measuring sensor
36 Monitoring unit
38 First channel
40 Second channel
41 Transmitter unit
42 Communication means
44 First checking means
46 Second checking means
M Pattern
P1 Arrow
P2 Arrow
51 First signals
52 Second signals
t1 First time
t2 Second time

The invention claimed is:

1. A device comprising
   a camera configured to capture a detection area and generate corresponding first signals;
   a display unit configured to display the detection area captured by the camera using the first signals;
   a light source array located in the detection area of the camera;
   an optical measuring sensor array configured to detect the display output of the display unit and generate corresponding second signals; and
   a computer configured to transmit a pre-definable pattern to the light source array, wherein the light source array is configured to actuate using the pre-definable pattern, and wherein the computer is configured to check whether the second signals generated by the optical measuring sensor array include the pre-definable pattern during evaluation of the display output of the display unit.

2. The device according to claim 1, wherein the camera is configured to transmit the first signals towards the display unit through a first channel, and wherein the optical measuring sensor array is configured to transmit the first signals to the computer through a second channel.

3. The device according to claim 2, further comprising a transmitter unit disposed in the first channel and configured to transmit the first signals from the camera to the display unit.

4. The device according to claim 3, wherein the transmitter unit is configured to communicate with the computer.

5. The device according to claim 1, wherein the computer is further configured to check the functioning of the light source array.

6. The device according to claim 1, wherein the computer is further configured to check the functioning of the optical measuring sensor array.

7. The device according to claim 1, wherein the light source array is located in an edge region of the detection area of the camera.

8. The device according to claim 1, further comprising a brightness sensor configured to determine brightness conditions in the detection area.

9. A method comprising:
   capturing, by a camera, a detection area and generating first signals corresponding to the captured detection area;
   reproducing, by a display unit, the detection area captured by the camera using the first signals;
   generating, by an optical measuring sensor array, second signals corresponding to a display output of the display unit transmitting, by a computer, a pre-definable pattern to a light source array, which actuates the light source array with a pre-definable pattern;
   detecting, by the computer, the second signals do not include at least a portion of the pre-definable pattern; and
   generating, by the computer, a warning signal in response to the detection that the second signals do not include at least the portion of the pre-definable pattern.

10. The method according to claim 9, further comprising:
    actuating the light source array with the pre-definable pattern at a first time; and
    determining, by the computer at a second time, when the second signals include the pre-definable pattern, wherein generating the warning signal is performed when the difference between the first time and the second time exceeds a pre-definable threshold value.

11. The method according to claim 9, wherein the light source array is actuated with a pre-definable pattern variously over time.

12. The method according to claim 9, further comprising adjusting, by the computer, the pre-definable pattern based on a functioning of the light source array.

13. The method according to claim 9, further comprising adjusting, by the computer, the pre-definable pattern based on a functioning of the optical measuring sensor array.

14. The method according to claim 9, further comprising:
    detecting, by the computer, a loss of functioning in a transmitter; and
    generating, by the computing system, a warning signal based on the detected loss of functioning in the transmitter.

15. The method according to claim 9, further comprising checking, by a transmitter, whether the first signals include the pre-definable pattern, wherein the detecting, by the computer, that the second signals do not include at least the portion of the pre-definable pattern is based on the check of the whether the first signals include the pre-definable pattern.

16. The method according to claim 9, further comprising determining, by a brightness sensor, light conditions in the detection area, wherein the light source array actuates based on the determined light conditions.

* * * * *